(No Model.) 5 Sheets—Sheet 1.

E. A. SPERRY.
MINING MACHINE.

No. 478,141. Patented July 5, 1892.

Witnesses:
N. C. Corliss
J. L. Tunison

Inventor:
Elmer A. Sperry
By Buckingham & Ewart
Attorneys

(No Model.)

E. A. SPERRY.
MINING MACHINE.

No. 478,141.

Patented July 5, 1892.

(No Model.)  5 Sheets—Sheet 3.

E. A. SPERRY.
MINING MACHINE.

No. 478,141.  Patented July 5, 1892.

Witnesses.
W. C. Corlies
J. L. Tunison.

Inventor
Elmer A. Sperry
By Buckingham & Ewart
Attorneys (No Model.) 5 Sheets—Sheet 4.
E. A. SPERRY.
MINING MACHINE.

No. 478,141. Patented July 5, 1892.

Witnesses.
W. C. Corlies
J. L. Timson

Inventor:
Elmer A. Sperry
By Buckingham & Evart
Attorneys.

(No Model.)   5 Sheets—Sheet 5.

E. A. SPERRY.
MINING MACHINE.

No. 478,141.   Patented July 5, 1892.

Witnesses.
W. C. Coolies
J. L. Timson.

Inventor.
Elmer A. Sperry
By Buckingham & Ewart
Attorneys.

UNITED STATES PATENT OFFICE.

ELMER A. SPERRY, OF CHICAGO, ILLINOIS, ASSIGNOR TO THE THOMSON-HOUSTON ELECTRIC COMPANY, OF BOSTON, MASSACHUSETTS.

MINING-MACHINE.

SPECIFICATION forming part of Letters Patent No. 478,141, dated July 5, 1892.

Application filed May 4, 1891. Serial No. 391,469. (No model.)

*To all whom it may concern:*

Be it known that I, ELMER A. SPERRY, of the city of Chicago, county of Cook, and State of Illinois, have invented certain new and useful Improvements in Mining-Machines, of which the following is a specification, reference being had to the accompanying drawings, in which similar letters and numerals of reference indicate like parts in all the figures.

My invention relates more particularly to that class of mining-machines which are employed in undercutting coal and wherein the cutting mechanism and motive power are mounted upon a traveling carriage, the cutting mechanism projecting laterally underneath the coal and performing its work as the machine advances along the face.

In the mining-machine to which my invention relates I employ as a cutting mechanism a laterally-projecting arm having a cutting-chain and for motive power I use electricity.

My invention relates more particularly to improved means for advancing the machine along the face of the coal while it is at work, to improvements in the construction and adjustment of the cutting mechanism, and to improvements in the construction of the feeding mechanism, and in novel means for supporting and guiding the traveling carriage.

The frame-work of my improved machine consists substantially of two side plates $a$ and A with cross-connecting castings C and D at the ends, and the cross-tie E of angle-iron near the longitudinal middle of the machine.

Motion is given to the operating parts by means of the motor F F, and to the novel means of supporting this motor within the frame I desire to now call particular attention.

$f'$ and $f''$ are the journal-boxes in which rotates the armature-shaft The box $f'$ is provided with a yoke extension which spans the end of the armature and is bolted to the pole-pieces at $f^3$ and $f^3$. The box $f''$ is provided with a similar yoke; but as this is at the commutator end of the armature and the box is at some distance from the pole-pieces I prefer to insert in the latter the stout studs $f^4 f^4$, to which the yoke on the box $f''$ is firmly bolted. The box $f'$ is bolted to the cross-tie E and the box $f''$ is bolted to the casting D in the front of the machine, and the boxes and yokes secured to the pole-pieces constitute the only support of the motor, and by simply loosening the bolts which hold the boxes to the frame the entire motor, fields, armature, and all may be lifted bodily from the machine. The yokes are of brass, of course, to prevent magnetic short-circuiting of the fields. Upon the armature-shaft is mounted the pinion G.

Depending from the cross-tie E is the hanger H, (shown in detail in Fig. 8,) and rigidly secured to the hanger H is the stud I. Upon the stud is mounted loosely the beveled pinion J, which is provided with an extended sleeve, upon which is loosely mounted the gear-wheel G''.

Figures 7, 8, 9, 10, 11:
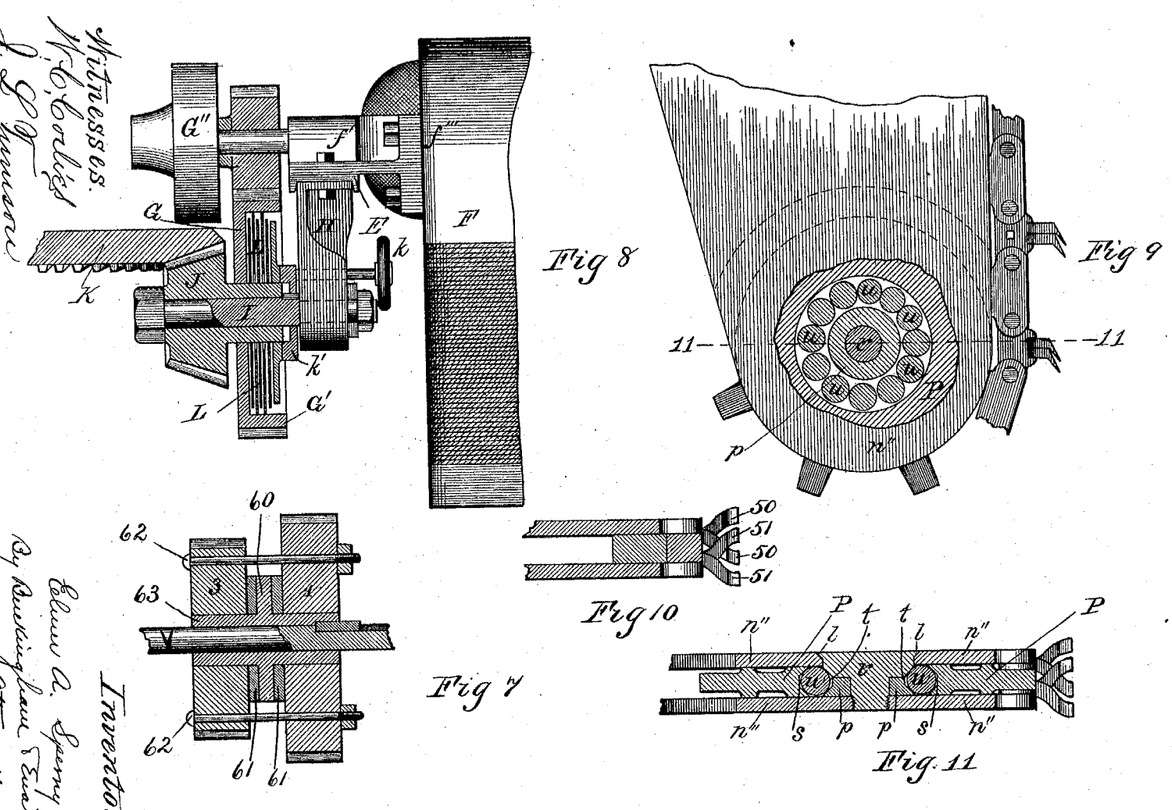
Fig. 7 is a sectional view in detail of the frictional safety device used in the feeding mechanism.
Fig. 8 is a detail view, partly in section, of the clutch connections between the motor and the cutting mechanism.
Figs. 9 and 11 are respectively plan and sectional views of the outboard-bearing of the cutting-chain wheel.
Fig. 10 shows the arrangement of the cutting-knives.

L L are plates of thin metal alternately connected with the inside of the rim of the gear-wheel and with the sleeve on the pinion J, forming the well-known friction-clutch, and by means of the hand-wheel $k$ and ring $k'$ the plates may be clamped together and motion transmitted from the gear $G''$ to the toothed pinion J.

In the casting in the rear end of the machine is journaled a vertical shaft having mounted upon its upper end the bevel gear-wheel K, which engages the beveled pinion J. On the lower end of the vertical shaft bearing the wheel K is a sprocket-wheel which engages with and drives the cutting-chain M, which passes around an idle sprocket-wheel on the outer end of the arm or outboard N. This outboard is constructed of two forged bars, as $n$ and $n'$, to the upper and under sides of which are bolted the flat plates shown in section in Fig. 11, which is a sectional view of the outer end of the arm, showing the bearing upon which the sprocket-wheel rotates. The arm N is made thin vertically between the plates bolted thereto and the frame, so as to have a vertical springiness for the purpose which will more fully appear.

In Figs. 9 and 11, P is the outer sprocket-wheel on the arm having its hub bored out to a considerable size and having a groove $s$ $s$ on the inner face of the hub, as shown in Fig. 11.

$p$ $p$ is a ring, which, in combination with the plug $r$, presents outwardly the groove $t$ $t$ toward the groove $s$ $s$, and between these grooves are placed balls $u$ $u$, which act as an anti-friction bearing for the outboard sprocket-wheel P. The plug $r$ is lipped on its upper end at $l$ $l$ and bears against the upper plate $n''$, and it is screwed into the lower plate $n''$, and its action is thus to secure two plates at the proper relative distance. By taking out the plug $r$ the balls may be extracted from between the ring and the wheel P, after which the ring $p$ may be taken out and then the wheel P removed from the arm. The bars $n'$ $n'$ are bolted firmly to the under side of the casting C, as shown in Fig. 4, there being a vertical offset at the side of the machine in the alignment of the bars $n'$, so as to bring the outboard sprocket-wheel P into horizontal alignment with the driving sprocket-wheel Q.

Figures 1, 6:
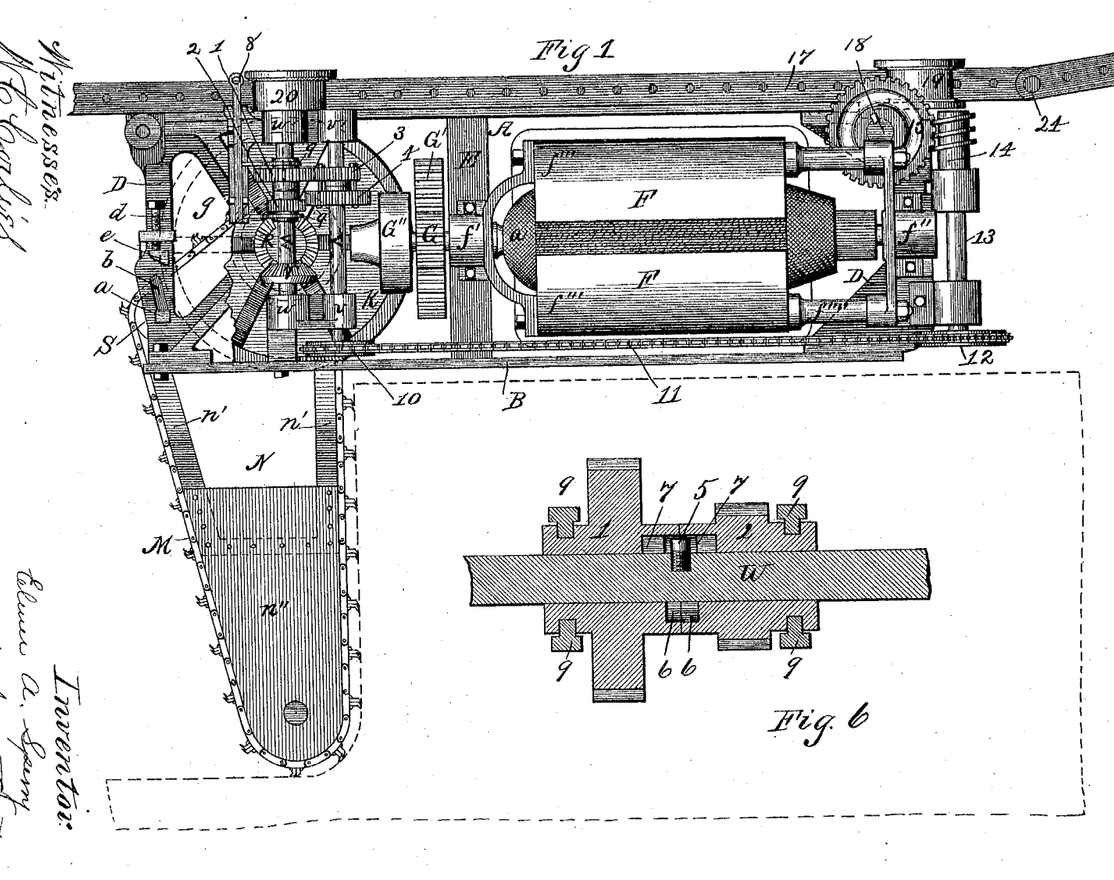
Figure 1 is a plan view of a machine embodying my improvements.
Fig. 6 is a section in detail of the clutch device used in the feeding mechanism.
Figure 4:
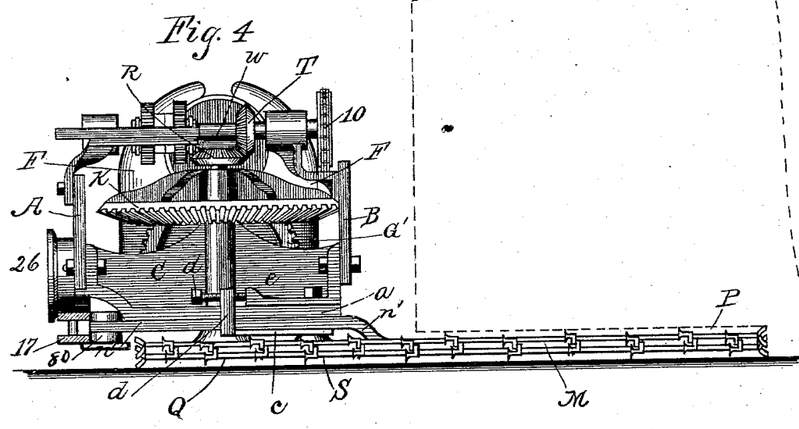
Fig. 4 is an end view from the rear.

As a means of tightening the cutting-chain, I use the device shown horizontally in Fig. 1 and vertically in Fig. 4, and in which S is a sprocket-wheel supported upon a vertically-disposed bolt $a$, (shown in dotted lines in Fig. 4 and vertically in Fig. 1,) which passes through the slot $b$ in the casting D and is provided upon its upper end with a tightening-nut.

On the under side of the frame-casting is a strap $c$, which firmly holds the bolt $a$ and which, extending transversely of the machine, is provided with the yoke $b$, which incloses the bar-like form of the frame-casting D, formed by the opening $g$ therein. An adjusting-screw $d$, passing through the yoke on the upper side, bears against the lug $e$ on the frame-casting, and by operating the screw the wheel S, through the medium of the strap $c$ and the bolt $a$, may be drawn against the tension of the chain M to any desired degree and then firmly secured in position by the additional aid of the nut on the bolt $a$.

Upon the extreme upper end of the vertical shaft carrying the wheel K and above the latter is the small beveled gear R, which engages with the similar gear on the transverse shaft W, Figs. 1 and 4, which is journaled in the boxes $w$ and $w'$, which are bolted to the frame of the machine. Parallel to the transverse shaft W is another transverse shaft V, which is journaled in the boxes $v$ and $v'$, also bolted to the sides of the machine. Upon the transverse shaft W are loosely mounted the spur-gears 1 and 2 of different sizes and which engage respectively with the spur-gears 3 and 4 on the parallel shaft V and which are rigidly attached to shaft V by a method more fully described hereinafter.

The method of mounting the gears 1 and 2 upon the shaft W is shown in detail in Fig. 6, in which 5 is a pin inserted in the shaft W, and in which 6 and 6 are annular recesses in the opposing faces of the gears 1 and 2.

7 and 7 are notches in the bases of the recesses, and are adapted to engage the pin 5.

In Fig. 1, 8 is a longitudinally-sliding bar having projecting laterally therefrom the forks 9 9, Figs. 1 and 6, which engage with grooves on the hubs of the gear-wheels 1 and 2, as shown in Fig. 6, and which by the movement of the bar operate to move the gears together longitudinally of the shaft, causing the pin 5 to engage with either of the wheels, as desired. The movement of the wheels 1 and 2 is not sufficient to throw either of them out of engagement with its mate 3 or 4 on the parallel shaft; but as only one of the gears 1 and 2 is in engagement with the pin 5 and the shaft W at the same time the other turns idly thereon as driven by its mate on the parallel shaft.

Figure 2:
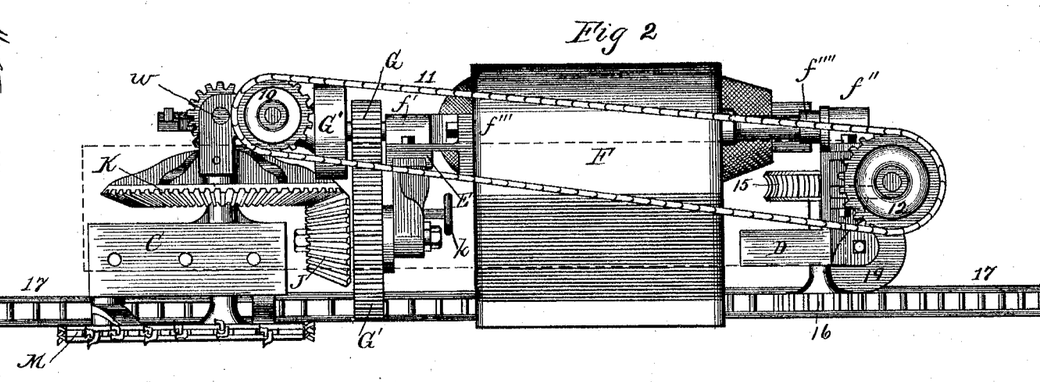
Fig. 2 is a side view as seen from the coal, with part of the frame removed to show the operating parts.
Figure 3:
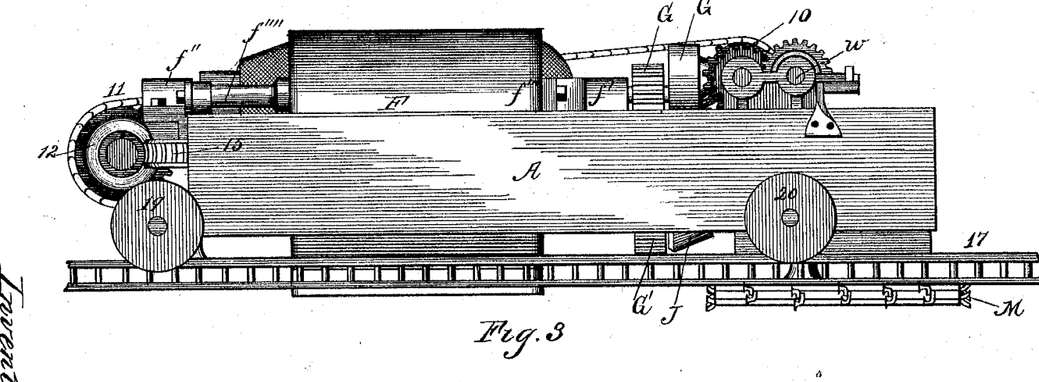
Fig. 3 is a side view as seen looking toward the coal.
Figure 5:
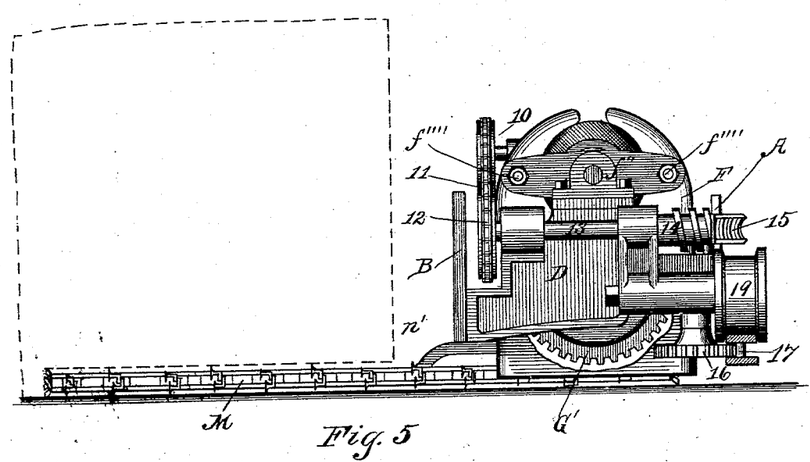
Fig. 5 is an end view from the front.

The transverse shaft V has mounted thereon the sprocket-wheel 10, which drives the chain 11, and that in turn the sprocket-wheel 12, mounted on the transverse shaft 13, which is journaled to the front end of the machine and which carries the worm 14. The worm 14 engages with and drives the worm-gear 15, mounted on the vertical shaft 18, on the lower end of which is the toothed wheel 16, Figs. 2 and 5, adapted to engage with the toothed rail 17, Figs. 1, 2, 3, 4, and 5, upon which the machine is supported by the flanged wheels 19 and 20, Figs. 1, 2, 3, 4, and 5.

Figure 17:
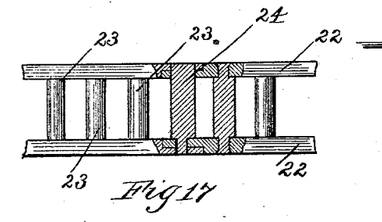
Fig. 17 is a view, partly in section, of the rail used in connection with the machine.

The form of rail which I prefer to use in connection with my improved machine is that shown in the drawings, and in detail in Fig. 17, and which consists of an upper and a lower bar of flat iron 22 22, with pintles 23 23, &c., placed vertically between them. These pintles I prefer to reduce in size at their ends, which are passed through the bars and rivet-headed above and below, and forming a shoulder to maintain the proper distance apart of the upper and lower bars. In joining the lengths of these rails in series I round the ends, as shown in Fig. 1, and halve the bars, as shown in Fig. 17, and through the two ends, when brought together, I drop the pin 24, Figs. 1 and 17, which is made with its lower end smaller than the balance, forming a shoulder which prevents its passing entirely through. The pin 24 I place so that it comes properly in the series of pintles which enter into the construction of the rail.

While I prefer the form of rail which I have shown and described herein, I do not wish to limit myself to that form; but if I desire I may use a rail having the ordinary web, through which I may pierce a series of holes for the engaging of the teeth of the wheel on the machine, or I may construct the rail with teeth of any proper form for co-operation with the toothed wheel on the machine.

A novel and important feature of my invention is the manner in which I support and fix the rail upon which the machine runs. In the first place I avoid laying the rail directly on the floor of the mine, for that is generally uneven in character and much time is consumed in leveling it, so that the rails may be laid firmly. It also is frequently the case that the general level of the coal-vein may vary, rendering it necessary to guide the machine vertically, so as to make it cut in conformity to the dip of the vein. It is also important to have a space between the rail and the floor of the mine to permit the free discharge of cuttings that are brought out by the cutting-chain at the side of the machine instead of permitting them to accumulate within the machine or be carried around by the driving sprocket-wheel until discharged in the rear.

By making the pivoted connection between the rail-lengths by having the connecting-pin both the pivot and a member of the series of teeth I am enabled to place the rails at an angle at curves in the face of the coal and pass the machine over the joint while in that position.

Figure 16:
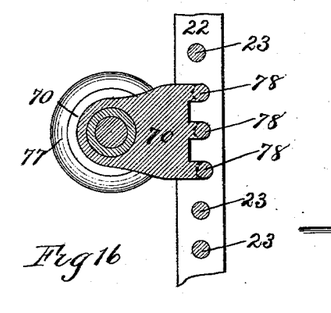
Fig. 16 is a section of Fig. 18 through the line $xx$.
Figure 18:
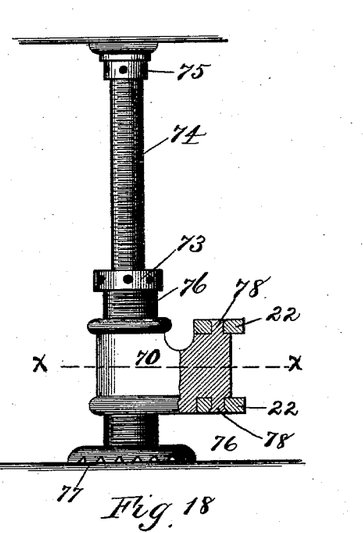
Fig. 18 is a detailed view of the jack-screw and adjustable bracket supporting the rail.

The method by which I support and fix the rail is shown in Figs. 16 and 18, in which 22 22 are the upper and lower bars of the rail. 76 is the lower part of a jack-screw, which is threaded externally, also, for the support of the bracket 70, to which the rail is attached, as herein more fully explained. By the rotation of the base of the jack-screw, preferably by the insertion of a bar into the holes 73, the bracket 70 and the rail may be adjusted vertically, as desired, and then by setting up the upper part of the jack by the use of the holes 75, as in the usual manner, the jack may be fixed and rendered rigid by direct pressure between the floor and the roof. If I prefer, I may roughen the bottom of the jack by the use of the points 77, formed thereon.

The bracket 70 is shown in horizontal section in Fig. 16 and is provided with the three vertically-disposed teeth 78 78 78, the upper and lower ends of which are projected and riveted through the upper and lower bars of the rail, and these teeth are so disposed that they form members of the series of teeth with the pintles. I prefer to use one of these brackets and its supporting-jack at or near each end of a rail-section, and by thus supporting it on only two supports, and those adjustable, I am able to adjust either end independently of the other, and thus incline the direction of the cutting of the machine as I desire.

As the mining-machine to which my invention relates is one that is designed for continuous travel along the face of the coal, I form the brackets which support the rail so as to project laterally from the supporting jack-screw to a considerable distance, as shown in Fig. 18, the object of such construction being to permit the machine to pass by the supporting jack-screw in its travel along the rail, and I leave a space between the rail and the jack-screw, as shown in the figure, for the passage of the flange on the wheel 19 between the rail and the jack-screw.

The tendency of the machine when at work is to draw the front end thereof in toward the face of the coal and to force the rear end thereof away from it. To prevent this, I use the double-flanged supporting-wheel 19, Fig. 1, at the front end, which by co-operation with the rail guides the machine and which also serves to hold the pinion 16, Fig. 5, in engagement with the teeth of the rail.

At the rear end, Fig. 4, I support the machine on the rail by the flanged wheel 20 and provide for lateral thrust by the horizontal rollers 80, which bear against the upper and lower bars of the rail, and the lower one of which has a horizontal flange projecting under the rail to prevent any lifting of the machine that might result from the strains and tensions at the cutting end. I use the rollers 80, also, because the lateral thrust is very great and they give a better bearing against the rail.

Figure 12:
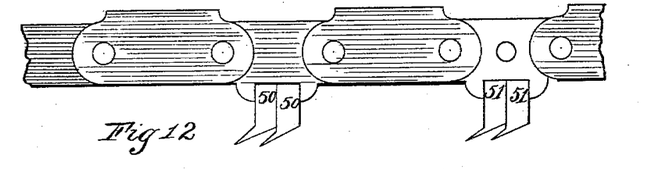
Fig. 12 is a plan view of part of the cutting-chain, showing the arrangement of the cutting-knives.
Figure 13:
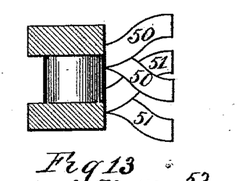
Fig. 13 is a section of the cutting-chain.
Figure 14:
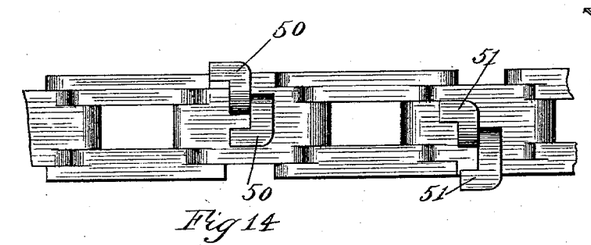
Fig. 14 is a face view of the chain and shows the arrangement of the knives.
Figure 15:
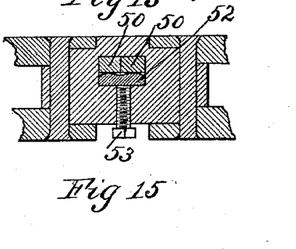
Fig. 15 is a longitudinal section of the chain through the cutting-knives and shows the method of securing the knives in the chain.

The cutter-chain which I use in my improved mining-machine is shown in Figs. 12, 13, 14, and 15, and consists of a series of links, in which the cutters are inserted. I prefer to use the form shown in the drawings, in which the successive cutter-bearing links are united by an intervening pair of non-cutter-bearing links, which connect with the cutter-bearing links the outside links, and between which the sprocket-wheel tooth projects and has a bearing vertically against the cutter-bearing links. The cutters or cutter-teeth are also shown in Figs. 12, 13, 14, and 15, and of these there are but two forms in the entire chain, one form projecting outwardly and upwardly and one form projecting outwardly and downwardly. I attach these teeth to the chain by inserting the shanks in holes in the cutter-bearing links and retain them there by a set-screw, as more fully explained hereinafter. The holes in the cutter-bearing links in which I insert the teeth are placed on one side of the longitudinal middle of the link, all of the cutter-bearing links being similar in form and cast from the same pattern and interchangeable throughout the chain. The cutter-bearing links I dispose in the chain successively reversed in position, so that in successive links the holes for the insertion of the teeth are alternately above and below the longitudinal middle of the chain, as shown in Fig. 14. In inserting the cutters in the chain I place an upwardly and a downwardly projecting cutter in each link, the shank of one cutter being in front of that of the other, as shown in Figs. 12, 14, and 15. The holes in the cutter-bearing links are preferably rectangular, and there is also placed therein the plate 52, Fig. 13. This plate I preferably groove along its longitudinal middle, so as to form a pair of longitudinal ribs, as shown in the figure, and which is pressed firmly against them by the set-screw 53, passing through the thick side of the cutter-bearing link. By the upward and downward projection of the teeth I separate the cutting-faces of the pairs of teeth, as shown in Figs. 13 and 14, so that the path of that tooth of one pair nearest the middle of the chain will lie between the paths of the teeth of the succeeding pair, and the cuts made by teeth 50 50, for instance, will be at some distance apart, and the upper tooth of the pair 51 will cut the kerf lying between the teeth 50 50, and the lower tooth of pair 50 50 will cut the kerf lying between the teeth 51 51, and thus I am enabled to present an aggregate of four cutting-faces to the kerf, as shown in Figs. 13 and 14, while in the entire chain there are but two forms of teeth instead of four, as has been customary before. This feature I consider of great importance, as the use of a machine of this character in the darkness of a mine is greatly facilitated by its simple construction.

I now call attention to the manner in which I attach the cutting-teeth to the chain and to their disposition along the chain. These points are illustrated in Figs. 12, 13, 14, and 15. I prefer to attach the teeth in pairs, as shown in the figures, the shank of one being in front of that of the other, as shown in Fig. 12, 14, and 15. The shanks are placed in a preferably rectangular hole in the link of the chain, and there is also placed therein the plate 52, Fig. 15. This plate I preferably groove along its longitudinal middle, so as to form a pair of parallel ribs, which bear, respectively, on the shanks of the teeth, as shown in the figure and which is pressed firmly against them by the set-screw 53.

I separate the cutting-faces of the pairs of teeth, as shown in Figs. 13 and 14, so that the path of that tooth of one pair nearest the middle of the chain will lie between the teeth of the succeeding pair, so that the cuts made by teeth 50 50, for instance, will be at some distance apart, and the upper tooth of pair 51 will cut the kerf lying between the teeth 50 50 and the lower tooth of the pair 50 50 will cut the kerf lying between the teeth 51 51, and in this connection there is this most important feature of my invention, and to which I desire to call particular attention: The aggregate of the cutting-faces of the teeth does not equal that of the entire width of the cut and the paths of the teeth are separated by a fillet left between them—for instance, the paths of any pair of teeth, as 50 50, and at some distance apart—and the fillet left between them is wider than the path of either tooth and wider than tooth 51, which lies between them. The removal of the fillet between the paths of the teeth is effected more by fracture than by cutting, and this action is greatly facilitated by using, in combination with the cutting-chain, an arm having a vertical springiness or elasticity, such as I employ in the machine herein described, as hereinbefore set forth, and the importance of this vertical springiness in the arm more fully appears from the fact that with it I need not give to the teeth the precise arrangement herein shown, but may arrange them in any manner so that in their operation their paths are separated, as the interlying fillet will be fractured off by the vertical vibration of the knives, due to the springiness of the arm.

In Fig. 7 is shown a frictional safety device which I use in the feed-gearing as a matter of precaution to avoid breaking of the parts in case of unusual obstruction in the progress of the machine.

3 and 4 are the gears of the traverse-shaft V. 63 is a sleeve keyed thereto and having integral therewith the radially-projecting flange 60.

61 61 are rings, preferably two, of leather or some other suitable pliable material, one on either side of the flange. The wheels 3 and 4 are loosely mounted on the sleeve 63, and they, with the flange 60 and the rings 61 61, are clamped together by the bolts 62 with a force sufficient to cause the gears to turn the shaft, but yet in case of great obstruction thereto to slip and avoid breaking of the mechanism.

It is found in practice that the action of the spherical balls in the outboard-bearing, which run in an annular groove and which is liable to become filled with the cuttings, is essentially different than where rollers or friction-wheels are employed. There being only a point of contact between the ball and the surfaces, their action does not seem to be interfered with by the incumbent material, which is the case to a serious degree where rollers or friction-wheels are employed.

As pointed out in this specification, (see pages 6 and 14 of the original draft,) the laterally-projecting arm carrying the cutting devices is mentioned as having vertical resilience, which is confined to a short portion of the arms lying between the housing for the wheels at the end and the body of the machine. This is accomplished by making the arms thin vertically. As the machines are constructed, these arms are thinner relatively than is shown in the accompanying drawings. It is found preferable, also, to make them of steel. In Fig. 1 the rear arm $n'$ is shown as having an angle backward, forming thereby a "truss" for more rigidly bracing the cutter-bar against the pressure exerted by the cutting-face, which lies along its front edge. Great rigidity in line of cut is found indispensable in a machine of this class.

I claim as my invention—

1. The combination of a self-propelling mining-machine having a laterally-projecting cutting mechanism mounted upon a carriage and adapted to continuous travel, a rail extending lengthwise of the mining or face to be cut, made up of a series of sections separately joined together at their ends, so as to bend in a horizontal plane at these points to conform to the irregularities in the face to be cut, each section being provided with means for removably fixing it in position, teeth upon the rail-sections, the pitch-line of which is in line of the articulations, and a pinion mounted upon the carriage to engage with the teeth upon the rail for the propulsion of the carriage, the work being performed by the side or edge of the laterally-projecting cutting device.

2. The combination of a mining-machine having a laterally-projecting cutting mechanism presenting a cutting-face along the side or edge thereof, mounted upon a traveling carriage, wheels mounted upon the carriage and bearing upon a rail on one side of the machine only for the support of the carriage, a tread upon the upper side of the rail upon which supporting-wheels bear, having a flange upon one side of the rail, vertically-disposed pintles constituting teeth and connecting the tread with a similar flat bar on the under side of the rail, a vertically-disposed shaft forming a part of the machine, and a pinion mounted on the shaft in engagement with such teeth for the propulsion of the carriage.

3. In combination with a mining-machine such as described, a guiding and supporting rail consisting of a single line or series of rail-sections joined end to end, each section being formed of a top and bottom bar and perpendicular pintles connecting them at intervals, said sections pivotally and detachably joined together at their ends, jack-posts or extensible props located at one side of such line of rails at sufficient distance to allow the machine to pass, and connections between the rails and jack-posts.

4. A single line or series of rail-sections, each section provided with means for adjustably supporting it, said sections pivotally and detachably joined together at their ends, whereby a horizontal adjustment of the alignment of the several sections is permitted to conform to the irregularity of the mine-face along which the work is performed, in combination with a machine adapted to travel along such rail, and a pinion upon a vertical shaft forming a part of the machine, such pinion co-operating with the rail to feed the machine, substantially for the purpose specified.

5. The combination of a self-propelling mining-machine having a laterally-projecting cutting mechanism mounted upon a carriage and adapted to continuous travel, a rail extending lengthwise of the mining or face to be cut, made up of a series of sections separably joined together at their ends, so as to bend in a horizontal plane at these points to conform to the irregularities in the face to be cut, the sections being provided with means for removably fixing them in position at an elevation from the floor of the mine, leaving a free space under and between the rail and the floor, teeth upon the rail-sections the pitch-line of which is substantially in line of the articulations, and a pinion mounted upon the carriage to engage with the teeth upon the rail for the propulsion of the carriage, the work being performed by the side or edge of the laterally-projecting cutting device.

6. A series of rail-sections, each consisting of an upper and a lower bar and intermediate perpendicular connecting-pintles, said sections detachably and pivotally connected at each of their ends by one of the pins, forming with the other pintles members of a series of teeth, in combination with a mining-machine adapted to travel along such rail by a pinion on a vertical shaft which engages with such pintles.

7. A series of longitudinal rail-sections, each having an upper and a lower bar and intermediate connecting-pintles, said sections being separably and pivotally connected end to end by pins, forming with the pivot and also with the pintles members of a series of teeth for co-operation with a pinion on the machine, and a vertical shaft upon which the pinion is mounted.

8. In combination with a mining-machine mounted upon a traveling carriage and adapted to continuous travel along a rail, a jack-screw bearing against the floor and the roof of the mine, a bracket mounted upon the jack-screw and projecting laterally therefrom, and a rail supported on the bracket at a distance from the jack-screw, whereby the machine is permitted to travel continuously along the rail and past the jack-screw.

9. In combination with a mining-machine, substantially as described, a series of jack-screws bearing against the floor and the roof of the mine, a bracket extending laterally from each, adjustably secured to one of the members of the jack, and a series of rails upon the brackets for the support and guidance of the machine.

10. In combination with a mining-machine, substantially as described, a series of jack-screws bearing against the floor and roof of the mine, a bracket extending laterally therefrom, having an internally-threaded portion and an externally-threaded portion on one of the members of the jack, and a series of rails upon the brackets for the guidance and support of the machine.

11. A jack-post bearing against the floor and the roof of the mine, a laterally-projecting bracket supported upon the jack-screw and vertically adjustable thereon, and a rail supported upon the bracket at a distance from the jack-post sufficient to admit the passage of the machine past the same, in combination with a machine supported upon the rail provided with wheels having flanges upon both sides of the track.

12. A series of jack-posts or extensible props resting upon the floor and bearing against the roof of the mine, brackets vertically adjustable on the jack-posts, and rail-sections rigidly attached to said brackets at a distance from the jack-posts sufficient to admit the passage of the machine past the jack-screw, the various sections united forming a continuous rail and coupled by a pivot admitting of the alignment being varied.

13. As a means of securing the cutting-teeth in the chain, the combination of the chain, the cutting-teeth in pairs, the grooved plate 52, and the set-screw 53.

14. In a mining-machine, the combination of a projecting arm, a wheel-bearing for the cutting-chain and having a groove within the hub, and spherical balls within the groove and between the same and a centrally-located portion of the arm.

15. In a mining-machine such as described, a bearing for the outboard-wheel carrying the cutting-chain, consisting of the combination of the wheel, the balls $u$, the inner ring $p$, and the plug $r$, with the upper and lower plates $n''$ of the arm.

16. The combination of the wheel having the groove within the hub and a groove on the arm, the groove on one of these elements being formed of two parts removably secured together, with balls in the grooves between the wheel and the arm.

17. The combination of the wheel having the groove within the hub, balls in the groove, a containing or supporting plate on each side of the wheel bearing two parts removably secured together and which form a groove opposing that in the hub of the wheel, and projecting flanges upon the parts which form the groove, whereby the plates are clamped together.

18. The combination of a self-propelling mining-machine having a laterally-projecting cutting-mechanism mounted upon a carriage and adapted to continuous travel, a rail extending lengthwise of the mining or face to be cut, made up of a series of sections separably joined together at their ends, so as to bend in a horizontal plane at these points to conform to the irregularities in the face to be cut, the sections being provided with means for removably fixing them in position, teeth upon the rail-sections the pitch-line of which is substantially in line of the articulations, and a pinion mounted upon the carriage to engage with the teeth upon the rail for the propulsion of the carriage, the work being performed by the side or edge of the laterally-projecting cutting device, in combination with a bearing pressed upon the lateral edge or edges of the rail and located at the rear of the machine, whereby the thrust of the laterally-projecting arm is resisted.

19. In a mining-machine, a chain having a series of cutter-bearing links which have cutters inserted therein in pairs in an opening located at one side of the longitudinal middle of the link, and a plate bearing against the shank of both teeth of a pair and secured therein by a set-screw passing through the thick side of the link.

ELMER A. SPERRY.

Witnesses:
A. M. HEYL,
M. D. LEVIN.